US006502015B1

United States Patent
Brookes et al.

(10) Patent No.: US 6,502,015 B1
(45) Date of Patent: Dec. 31, 2002

(54) TERRAIN FOLLOWING APPARATUS FOR A VEHICLE

(75) Inventors: Tom M Brookes, Plymouth (GB); Laurence Day, Gunnislake (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/719,576

(22) PCT Filed: Oct. 31, 2000

(86) PCT No.: PCT/GB00/04165

§ 371 (c)(1),
(2), (4) Date: Dec. 14, 2000

(87) PCT Pub. No.: WO01/36911

PCT Pub. Date: May 25, 2001

(30) Foreign Application Priority Data

Nov. 19, 1999 (GB) .............................................. 9927281

(51) Int. Cl.[7] .............................................. G01S 13/94
(52) U.S. Cl. ..................... 701/3; 701/4; 701/9; 701/14; 701/18; 340/970; 340/947; 340/220
(58) Field of Search ................................ 701/3, 9, 301, 701/16, 18, 4, 14; 340/970, 967, 947, 951, 220; 244/220; 342/64

(56) References Cited

U.S. PATENT DOCUMENTS

| 4,043,526 | A |   | 8/1977  | Donley et al. ............... 244/194 |
| 4,490,794 | A | * | 12/1984 | Griffith et al. .............. 318/584 |
| 5,920,276 | A | * | 7/1999  | Frederick ..................... 342/26 |
| 5,923,286 | A | * | 7/1999  | Divakaruni ................. 342/357 |
| 6,021,374 | A | * | 2/2000  | Wood ......................... 701/301 |
| 6,178,379 | B1 | * | 1/2001  | Dwyer ........................ 701/205 |
| 6,216,065 | B1 | * | 4/2001  | Hall et al. .................... 701/16 |
| 6,219,592 | B1 | * | 4/2001  | Muller et al. .................. 701/9 |
| 6,281,832 | B1 | * | 8/2001  | McElreath ................... 342/65 |
| 6,347,263 | B1 | * | 2/2002  | Johnson et al. .............. 701/14 |

FOREIGN PATENT DOCUMENTS

| EP | 0 802 469 | 10/1997 |
| FR | 2 749 676 | 12/1997 |
| GB | 1 218 112 | 1/1971 |
| GB | 2 310 184 | 8/1997 |

OTHER PUBLICATIONS

J.R. Fountain, "Future Systems for Low Flying Operations" *IEEE Colloquium on Serious Low Flying*, No. 1998/223, pp. 8/1–6, Feb. 1998.
F. Barfield et al, "All Terrain Ground Collision Avoidance and Maneuvering Terrain Following for Automated Low Level Night Attack" *IEEE 11th Digital Avionics Systems Conference*, pp. 13–18, Oct. 1992.

* cited by examiner

*Primary Examiner*—Tan Nguyen
*Assistant Examiner*—Tuan C To
(74) *Attorney, Agent, or Firm*—Nixon & Vanderhye P.C.

(57) ABSTRACT

A Terrain Following Apparatus for a vehicle such as an aircraft includes means (1) for effecting autonomous following of terrain by the vehicle, a control device (2), operable by a person operating the vehicle, to engage and disengage the means (1), a Terrain Referenced Navigation system (3) operable to provide navigation data for the vehicle, and validation means (4) for validating the integrity of the navigation data to provide when the integrity of the navigation data is validated for engagement of the autonomous Terrain Following means (1) by the device (2) and when the integrity of the navigation data is invalidated, for preventing operation of the means (1) when the control device (2) is operated.

12 Claims, 2 Drawing Sheets

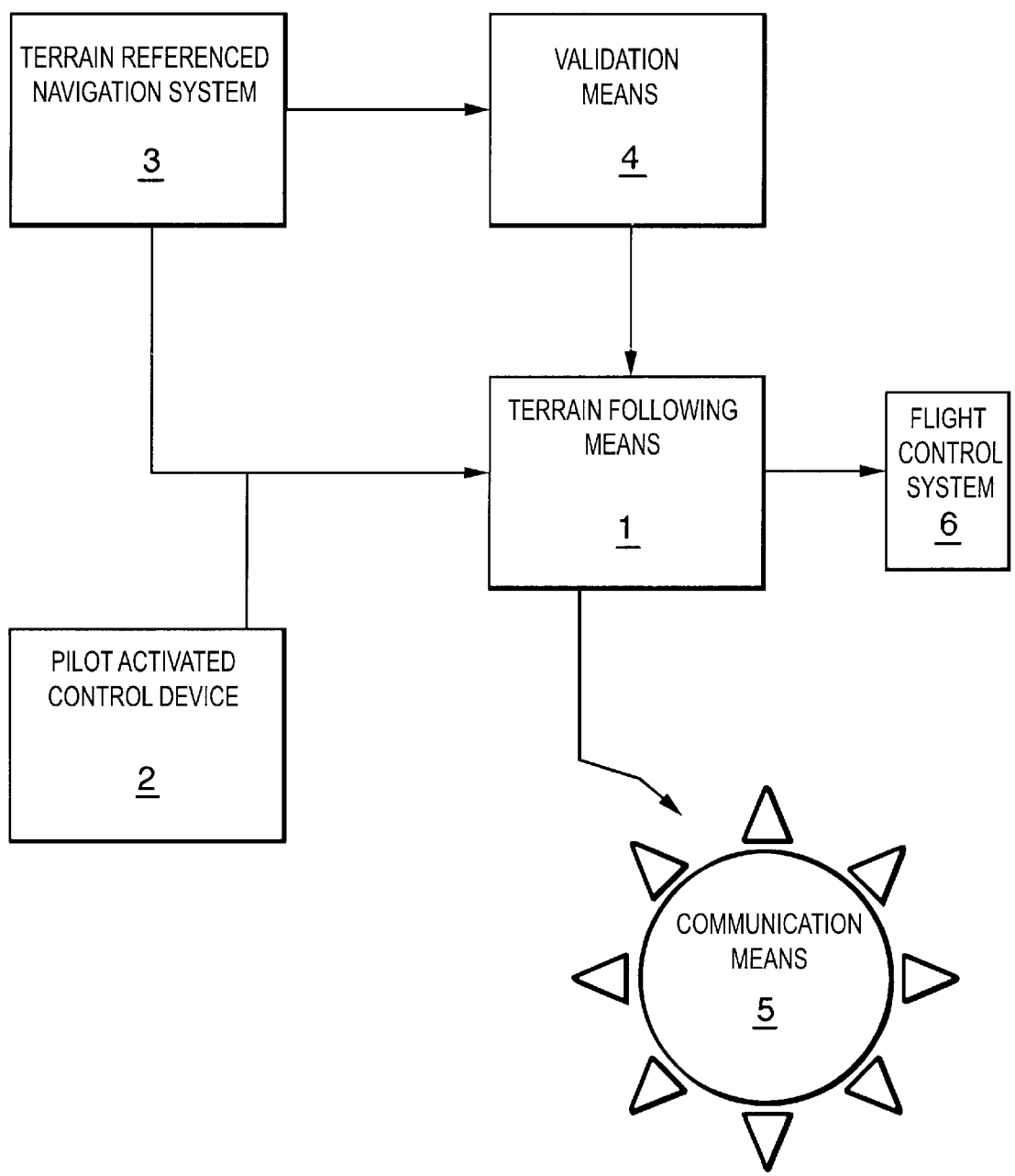

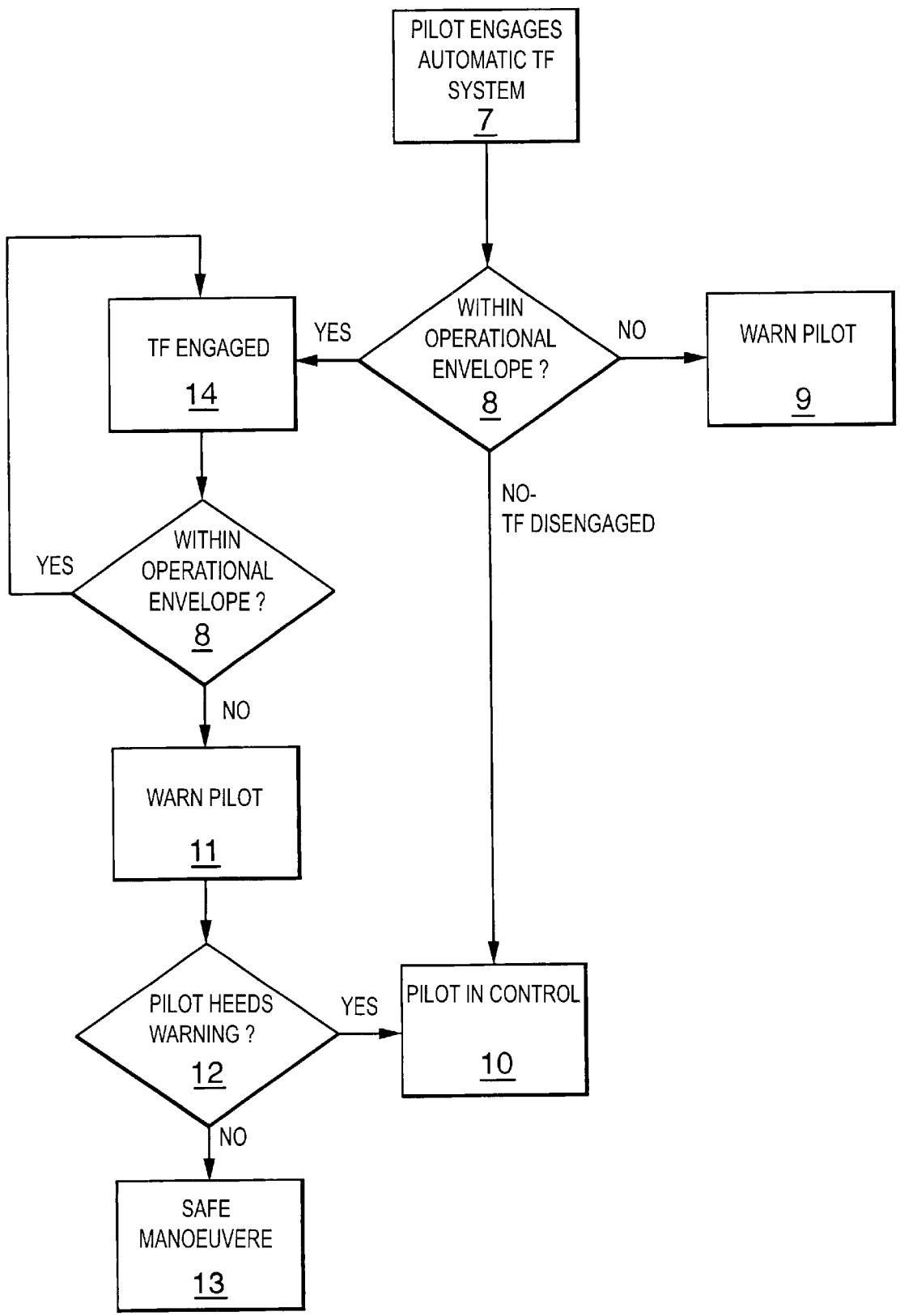

TERRAIN FOLLOWING APPARATUS FOR A VEHICLE

BACKGROUND OF THE INVENTION

1. Field of the Invention

This invention relates to terrain following apparatus for a vehicle, particularly, but not exclusively, suitable for providing an assisted terrain following capability to the pilot of an aircraft.

2. Discussion of Prior Art

A Terrain Referenced Navigation (TRN) system currently may be provided on vehicles such as aircraft to provide accurate position registration relative to the terrain by referencing a vehicle position within a digital terrain map database. By virtue of the digital map and by knowing the vehicle position accurately, it can also provide the vehicle driver or pilot with warnings of impending obstacles and cues for avoidance action. In the case of aircraft, these warnings can be of Impending Controlled Flight Into Terrain (CFIT) and cues for low level terrain following flight. Current Terrain Referenced Navigation systems for aircraft generally combine the aircraft Inertial Navigation System data with measurements of height above ground level, altitudes above mean sea level and terrain heights from the stored map data to provide high precision drift-free navigation. The high precision drift-free navigation generally includes accurate terrain referenced position registration, warning of impending controlled flight into terrain, situational awareness terrain display and terrain following cues.

However, such a Terrain Referenced Navigation system only provides advisory information to the vehicle driver such as an aircraft pilot and in aircraft flight conditions, which are unduly hazardous and in which the pilot may be operating at less than normal or peak efficiency, there is a need for ensuring that the vehicle driver or aircraft pilot is assisted in driving the vehicle or flying the aircraft with increased safety.

There is thus a need for a Terrain Following Apparatus for a vehicle which can effectively assist, in a safe manner, the vehicle operator to drive or fly the vehicle.

SUMMARY OF THE INVENTION

According to the present invention, there is provided a Terrain Following Apparatus for a vehicle including, means for effecting autonomous following of terrain by a vehicle, when the apparatus is operatively associated with the vehicle, a control device, operable by a person operating the vehicle, to engage and disengage the autonomous Terrain Following means, a Terrain Referenced Navigation system operable to provide navigation data for the vehicle, and validation means for validating the integrity of the navigation data, and for providing, when the integrity of the navigation data is validated, an output signal for permitting the control device, when engagedly operated by a person operating the vehicle, to operate the autonomous Terrain Following means to provide autonomous terrain following by the vehicle, and providing, when the integrity of the navigation data is invalidated, an output signal for preventing the control device when engagedly operated by a person operating the vehicle, from operating the autonomous Terrain Following means.

Preferably, the control device is an electromechanical device.

Conveniently, the control device is a non-latching device.

Advantageously, the control device is operable on failure of the device to disable autonomous operation of the vehicle.

Preferably, the navigation data provided by the Terrain Referenced Navigation system includes outputs of best estimates of position and height of the vehicle.

Conveniently, the validation means includes status means to establish whether the best estimates of position and height are within a desired operating range and to output a status result thereof, which status means is operable on a continuous basis to update the status result.

Advantageously, the apparatus includes communication means for communicating the status results to the person operating the vehicle, when the apparatus is operatively associated with the vehicle, to indicate desirability or otherwise of engaging the autonomous Terrain Following means.

Preferably, the validation means is operable automatically to deactivate the autonomous Terrain Following means on receipt of a negative status result, irrespective of whether the control device has been activated by the person operating the vehicle.

Conveniently, automatic deactivation of the autonomous Terrain Following means by the validation means occurs after transmission of the negative status result to the person operating the vehicle.

Advantageously, the communication means includes a video display and/or an auditory warning unit.

Preferably, the autonomous Terrain Following means is adapted for controllable connection to a movement control system of the vehicle.

BRIEF DESCRIPTION OF THE DRAWINGS

For a better understanding of the present invention, and to show how the same may be carried into effect, reference will now be made, by way of example, to the accompanying drawings in which;

FIG. 1 is a block diagram for components of a Terrain Following Apparatus according to the present invention, and FIG. 2 is a flow diagram of the operational function of the Terrain Following Apparatus of FIG. 1.

DETAILED DESCRIPTION OF THE INVENTION

A Terrain Following Apparatus for a vehicle according to the present invention is suitable for operation with any manually controllable vehicle for land, sea or air use but for clarity and simplicity, the apparatus will be described hereinafter for use with a manually piloted aircraft. With reference to FIG. 1 of the accompanying drawings, the Terrain Following Apparatus of the present invention includes means 1 for effecting autonomous following of terrain by a vehicle when the apparatus is operatively associated with the vehicle. A control device 2 is provided which is operable by the person operating the vehicle such as the pilot of an aircraft, to engage and disengage the autonomous Terrain Following means 1. The control device 2 is an electromechanical switch used by the pilot to engage the assisted Terrain Following function. The device 2 preferably is non-latching so that when the means 1 are engaged, the device 2 must be actively engaged by the pilot at all times. As the control device 2 is connected to the means 1, the status of the device 2 can be read by the means 1. Thus the performance and the monitoring of the position of the control device 2, that is the status of the device 2, is a high integrity safety critical function. Hence, the autonomous following of terrain by the aircraft function can be overridden at all times by the pilot via the control device 2 to take back full manual control of the aircraft.

The apparatus of the invention also requires a Terrain Referenced Navigation system 3 which is operable to provide navigation data for the aircraft. This system 3 operates as previously described and the navigation data provided by the system 3 includes outputs of best estimates of position and height of the aircraft. The system 3 additionally provides pull-up, pull-down commands to the means 1 to allow the aircraft to maintain a fixed height above a terrain.

Also forming part of the apparatus of the present invention is validation means 4 for validating the integrity of the navigation data supplied by the Terrain Referenced Navigation system 3. The validation means 4 is operable to provide, when the integrity of the navigation data is validated, an output signal for permitting the control device 2 when engagedly operated by a pilot of the aircraft, to operate the autonomous Terrain Following means 1 to provide autonomous terrain following by the aircraft, and for providing, when the integrity of the navigation data is invalidated, an output signal for preventing the control device 2 when engagedly operated by the pilot, from operating the autonomous Terrain Following means 1.

Hence, the validation means 4 is used to determine if the control device 2 and Terrain Referenced Navigation system 3 are within the operational envelope for the aircraft and that they are functioning correctly. The validation means 4 contains a status means (not shown) to establish whether the best estimates of position and height are within a desired operating range and to output a status result therefrom, which status means is operable on a continuous basis to update the status result. Thus the validation means 6 monitors internal status information from within the Terrain Referenced Navigation system 3 and compares the values with pre-defined thresholds. The aircraft status is obtained from the aircraft Inertial Navigation unit and is also compared with pre-defined thresholds. In other words, the validation means 4 monitors information provided by the Terrain Referenced Navigation system 3 on the current status of the aircraft and on the current goodness of fit of the navigation system. The performance and function of the validation means 4 is safety critical to the aircraft and failure mode of the validation means must disengage the control device 2 and the autonomous Terrain Following means 1 to return control of the aircraft back to the pilot.

The apparatus on the invention also includes communication means 7 for communicating the status results to the pilot to indicate desirability or otherwise of engaging the autonomous Terrain Following means 1. Preferably the communication means 5 includes a video display and/or an auditory warning unit.

The validation means 4 is operable automatically to deactivate the autonomous Terrain Following means 1 on receipt of a negative status result, irrespective of whether the control device 2 has been activated by the pilot. Automatic deactivation of the autonomous Terrain Following means 1 by the validation means 4 occurs after transmission of the negative status result to the pilot.

The autonomous Terrain Following means 1 is adapted for controllable connection to a movement control system 6 for the vehicle, which in the case of an aircraft, is a flight control system. The autonomous Terrain Following means 1 filters and reformats the Terrain Following commands from the Terrain Following system included within the Terrain Referenced Navigation system 3 and changes them into a format which can be used by the movement control system 6. The means 1 processes the information from the validation means 4 to determine if the vehicle, such as an aircraft, and the Terrain Referenced Navigation system 3 are within the envelope for operation. The means 1 monitors the position of the control device 2 to determine if autonomous Terrain Following has been selected and generates a warning to the pilot when the autonomous Terrain Following function becomes invalid. The movement control system 6 which preferably is a flight control system for an aircraft, provides means to translate the commands from the autonomous Terrain Following means 1 when selected, into control signals which move the vehicle or aircraft. The autonomous Terrain Following means 1 generates a pull-up or safety enhancing manoeuvre for the aircraft if the pilot ignores warnings provided to the communication means 5.

FIG. 2 of the accompanying drawings shows a flow diagram for the autonomous following of terrain by the means 1 to provide an assisted Terrain Following function for the pilot. Thus, the flow diagram of FIG. 2 applies specifically to a vehicle in the form of an aircraft. In this flow diagram, firstly the pilot descends above the desired height above terrain at which the aircraft to fly, subject to a minimum set clearance height. Once the aircraft has reached this height and the Terrain Referenced Navigation system 3 is giving valid output signals as indicated on the display of the communication means 5, the pilot engages the control device 2 and thus engages the autonomous Terrain Following means 1. This is shown in FIG. 2 at (7). The validation means 4 then checks to see if it is in the operational envelope of the autonomous Terrain Following function and if it is, the autonomous Terrain Following means 1 is engaged to provide autonomous Terrain Following to assist the pilot, a message is displayed on the display of the communication means 5 and the aircraft flies along a Terrain Following computer trajectory. This is indicated at 8. Otherwise, a warning is displayed via the communication means 5 to the pilot as illustrated at 9 and the pilot retains manual control of the aircraft.

The aircraft will then continue to fly along the desired flight paths at the set height above ground level, changing direction at way points as commanded by the mission computer of the aircraft, whilst the pilot continues to engage the control device 2 which preferably is provided on the control column of the aircraft. If the control device 2 is disengaged, control will revert to the pilot as shown at 10. If the autonomous Terrain Following function provided by the means 1 goes outside the operational envelope when engaged, a warning is displayed at 11 via the communication means 5 to the pilot that the autonomous Terrain Following means 1 should be disengaged. If the pilot heeds the warning as at 12 the aircraft will be returned as at 10 to full pilot control. If the pilot ignores the warning as 11 for a predetermined time, a safe manoeuvre is generated via the Terrain Referenced Navigation system 3 and autonomous Terrain Following means 1 as shown at 13 and a warning alarm is sounded. At this point, the autonomous Terrain Following means 1 will be disengaged automatically and the aircraft returned to pilot control. In FIG. 2, box 14 represents engagement of the autonomous Terrain Following means 1.

The apparatus of the present application provides the advantages of reducing the vehicle operator, preferably the aircraft pilot, workload. This allows in the case of an aircraft, the aircraft to be flown at low level autonomously in a fail-safe mode.

What is claimed is:

1. A terrain following apparatus for an aircraft having flight control surfaces and a pilot for effecting autonomous following of terrain by the aircraft, said apparatus comprising:

a terrain following means for autonomously controlling said flight control surfaces to maintain said aircraft a specific distance from terrain over which said aircraft is flying;

a control device, operable by said pilot, to engage and disengage the autonomous terrain following means;

a terrain referenced navigation system for providing navigation data for the aircraft; and validation means for validating and invalidating the integrity of the navigation data and for providing, when the integrity of the navigation data is validated, an output signal for permitting the control device, when engagedly operated by the pilot, to operate the autonomous terrain following means and for providing, when the integrity of the navigation data is invalidated, an output signal for preventing the control device, when engagedly operated by said pilot, from operating the autonomous terrain following means.

2. Apparatus according to claim 1 wherein the control device is a electromechanical device.

3. Apparatus according to claim 1, wherein the control device is a non-latching device.

4. Apparatus according to claim 1, wherein the control device is operable on failure of the device to disable autonomous operation of the aircraft.

5. Apparatus according to claim 1 wherein the navigation data provided by the terrain referenced navigation system includes outputs of best estimates of position and height of the vehicle, above a datum point.

6. Apparatus according to claim 5 wherein the validation means includes status means to establish whether the best estimates of position and height are within a desired operating range and to output a status result therefrom, which status means is operable on a continuous basis, to update the status result.

7. Apparatus according to claim 6, including communication means for communicating the status results to the pilot, when the apparatus is operatively associated with the vehicle, to indicate desirability or otherwise of engaging the autonomous terrain following means.

8. Apparatus according to claim 7, wherein the validation means is operable automatically to deactivate the autonomous terrain following means on receipt of a negative status result, irrespective of whether the control device has been activated by the pilot.

9. Apparatus according to claim 8, wherein automatic deactivation of the autonomous terrain following means by the validation means occurs after transmission of the negative status result to the pilot.

10. Apparatus according to claim 7, wherein the communication means includes one of a video display and an auditory warning unit.

11. Apparatus according to claim 1, wherein the autonomous terrain following means is adapted for controllable connection to a movement control system of the vehicle.

12. An aircraft including a terrain following apparatus according to claim 1.

* * * * *